Nov. 5, 1963   D. B. YETTER   3,109,566
SPRAY VALVE STRUCTURE
Filed Dec. 3, 1962
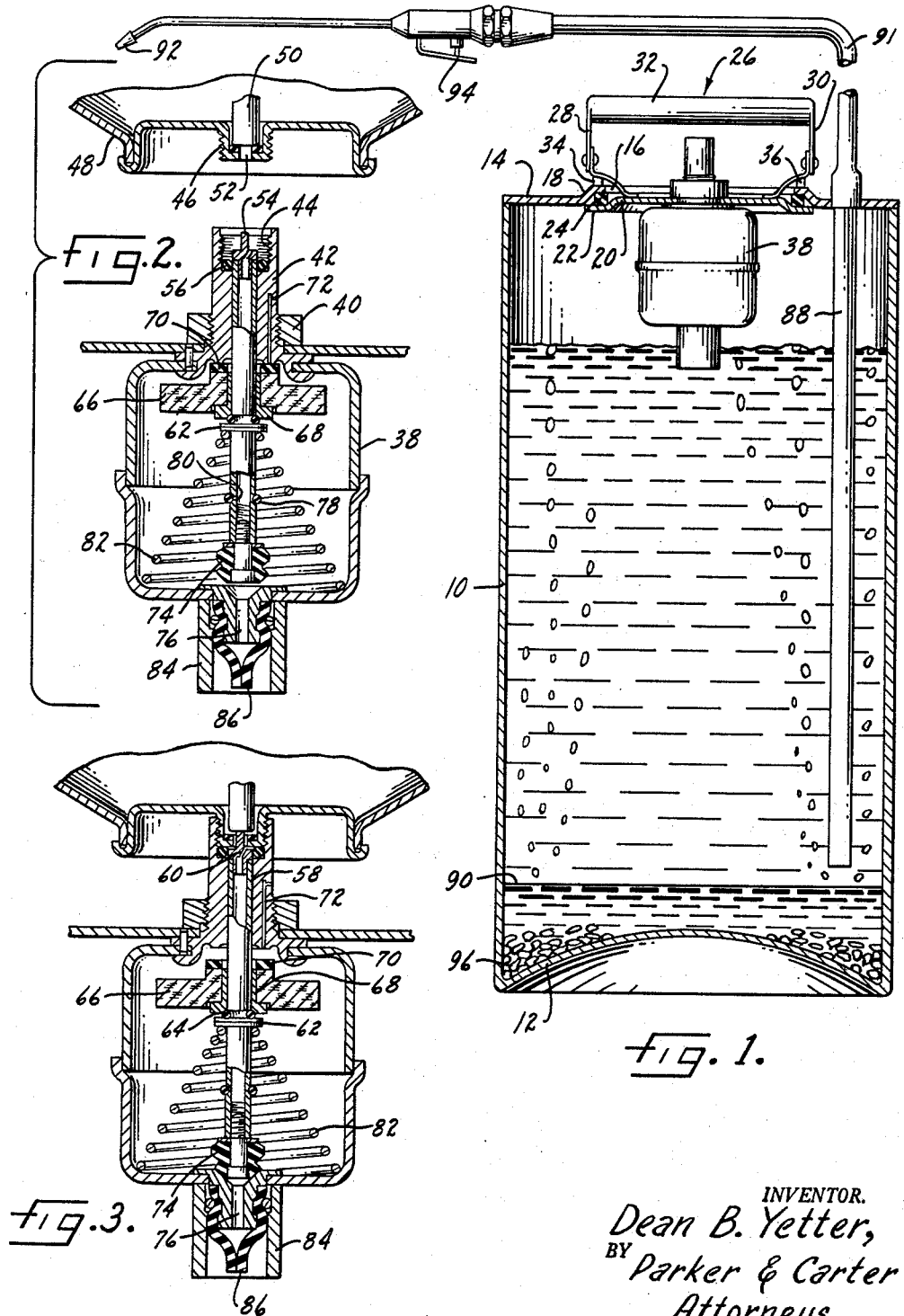
INVENTOR.
Dean B. Yetter,
BY Parker & Carter
Attorneys.

United States Patent Office 3,109,566
Patented Nov. 5, 1963

3,109,566
SPRAY VALVE STRUCTURE
Dean B. Yetter, Hebron, Ill., assignor to Crown Industrial Products Company, Woodstock, Ill., a corporation of Delaware
Filed Dec. 3, 1962, Ser. No. 241,902
14 Claims. (Cl. 222—394)

This invention relates to pressurized garden sprays and in particular to a means for providing a metered amount of propellant to pressurize a spray tank, and is a continuation-in-part of my co-pending application Serial No. 47,866, filed August 5, 1960, now abandoned.

One purpose of the present invention is a pressurized garden spray which does not utilize the conventional pump to pressurize the spray tank.

Another purpose is an improved metering valve for use in a pressurized garden spray.

Another purpose is an improved pressurizing means for a garden spray or the like wherein a metered amount of propellant, sufficient to pressurize a given spray tank, is introduced therein.

Another purpose is a garden spray utilizing a pressure cartridge or aerosol can to supply sufficient pressure to operate the spray.

Another purpose is an improved method of pressurizing a garden spray tank wherein a metered amount of a suitable propellant, for example Freon, is admitted into the tank prior to use.

Another purpose is a metering valve for use in a pressurized garden spray or the like which is adapted to close after the proper amount of propellant has been taken from a pressure cartridge.

Other purposes will appear in the ensuing specification, claims and drawings.

The invention is illustrated diagrammatically in the following drawings wherein:

FIGURE 1 is a vertical section of the garden spray tank of this invention,

FIGURE 2 is a section showing the metering valve of this invention in one position, and FIGURE 3 is a section showing the metering valve in further position.

A generally cylindrical tank 10 may have an upwardly domed bottom 12 and a top wall 14 with a generally central aperture 16. As clearly shown in FIGURE 1, there may be an upturned flange or lip 18 surrounding the filling opening or aperture 16. A generally circular plate or the like 20 may be positioned in the opening 16 and may have an outwardly and downwardly extending flange or lip 22 which cooperates with the lip 18 and a seal ring 24 positioned therebetween to seal the opening 16. Secured to the plate 20 is a handle structure 26 including diametrically opposed bracket members 28 and 30 secured at opposed points to the plate 20, and a handle 32 pivotally mounted at its opposite ends to the bracket members. The plate 20 and the associated handle structure are removable and when removed provide an opening for filling the tank with spray liquid. The handle structure is completed by a pair of lugs 34 and 36 secured to the underneath side of the brackets 28 and 30. When the plate 20 is inserted in the tank, the lugs are pressed down against the flange or lip 18 thereby forming a tight seal for the opening 16.

Attached to the underneath side of the plate 20 is a metering can 38 which in the preferred form is adapted to contain an amount of propellant sufficient to completely pressurize the spray tank.

Positioned above the metering can 38 and secured to the top of the plate 20 is an internally threaded washer 40 within which is mounted a sleeve 42. The sleeve 42 has an enlarged upper opening 44, which is threaded, to receive a threaded portion 46 of a pressure cartridge 48, which in the preferred form is an aerosol can or the like. The details of the aerosol can will not be described as they may be conventional. The aerosol can may have a release 50 which, upon being depressed, permits the flow of the liquid propellant in the aerosol can through opening 52. The aerosol can is screwed into the opening 44 such that a projection or trigger 54 is inserted through the opening 52 and into contact with the release 50. A small O-ring seal 56 is placed at the bottom of the opening 44 to seal the aerosol can from the surrounding area when it is positioned in the sleeve.

Movably mounted within the sleeve 42 is a valve stem 58 which carries the projection 54 at its upper end and which forms a part of the valve member which is positioned within the metering can 38. There is a small passage or the like 60 in the upper portion of the valve stem 58 which places the hollow interior of the stem in communication with the aerosol can or pressure cartridge.

The valve stem 58 extends down into the metering can and may have a pair of small washers 62 secured thereto generally intermediate the ends of the stem. Positioned on top of the washers 62 is a small O-ring seal 64 and positioned on top of the O-ring 64 is a floatable valve member 66, which preferably is formed of cork. The floatable valve member 66 fits on a bushing 68 which is slideable on the valve stem. The top side of the valve member 66 may have a suitable seal ring 70 positioned thereon so that when the valve member is in the up position, such as shown in FIGURE 2, the valve member will seal off an exhaust port 72 in the sleeve. The port 72 is in communication with the atmosphere and with the interior of the metering can when the floatable valve member is in the position of FIGURE 3.

Carried at the lower end of the valve stem 58 is a seal ring 74 which is adapted to seal the metering can outlet 76 when the valve is in the down position, such as shown in FIGURE 3. Normally, the metering can outlet 76 is open, such as shown in FIGURE 2. An O-ring 78 intermediate the ends of the valve stem 58 is effective to close the metering can inlet 80, which is a small port or opening in the hollow portion of the valve stem. In other words, propellant, whether it be gaseous or liquid, is admitted from the pressure cartridge down through the passage formed by the hollow valve stem and is admitted into the metering can through the port 80. The pressure of the propellant, whether it be liquid or gas, is sufficient to move the O-ring 78 away from the port 80, thus permitting the propellant to flow into the metering can.

A coiled spring 82 is seated upon the bottom of the metering can and is in operable contact with the washer 62 mounted on the valve stem 58. The coil spring 82 normally biases the valve stem and hence the floatable valve member 66 to the up position of FIGURE 2, closing the exhaust port 72 and leaving the metering can outlet open. The metering can is completed by a small sleeve 84 attached to the bottom of the can and surrounding the outlet, and by a check valve 86 positioned in the sleeve. The check valve 86, which is normally closed, will pass propellant from the metering can into the interior of the spray tank, but will not permit the flow of water up into the metering can if the spray tank is filled above the level of the outlet 76.

A standpipe or the like 88 extends down into the spray tank to a level just above an interface 90, which will be explained more fully hereinafter. The standpipe 88 may be suitably connected to a hose or the like 91 having a spray nozzle 92 and a suitable trigger or release 94. I may position an assortment of nuts, bolts, rocks or other sharp objects, indicated at 96, at the bottom of the tank to facilitate the rise of bubbles forming in the liquid propellant.

In the operation of the pressuring means it is preferred that the propellant contained in the pressure cartridge be a fluid heavier than water or heavier than the spray liquid. Such a fluid may be liquid Freon. When the liquid Freon is admitted from the metering can into the tank, being heavier than the spray liquid, the Freon will drop directly to the bottom of the spray tank, hence forming the interface 90 mentioned above. As clearly shown in FIGURE 1, the Freon will form a layer at the bottom of the tank as it is not soluble in the spray liquid. The standpipe 88 normally stops just above the Freon level or interface so that it does not extend down into the propellant and only the spray liquid will enter the pipe. The amount of Freon or other liquid propellant that is introduced by the metering valve is consistent that the volume of the particular spray tank so that the propellant will be fully vaporized when all of the liquid is drawn out of the tank. In the preferred form the amount of propellant may be approximately one-half one percent by weight of the capacity of the spray tank. In other words, a measured shot of propellant is being substituted for the conventional pump, and regardless of the amount of water or spray liquid in the tank the propellant will completely empty the tank of its contents.

The tank is sealed once the plate 20 is inserted in the opening 16 and the handle is turned. The Freon then serves as a pressure source. The temperature of the tank and liquid is such that once the liquid propellant is admitted into the tank, a portion of the propellant will boil off forming a pressure head above the liquid. The pressure head forces the liquid out of the tank. As the nozzle is operated and the liquid or water is sprayed, the air space above the spray liquid becomes larger and there would be a decrease in pressure except that as the liquid leaves the tank, or the volume of liquid decreases, more propellant will boil off to maintain the tank pressure. In other words, the propellant maintains the tank at a certain pressure consistent with tank volume and the temperature of the liquid, and independent of the volume of liquid in the tank. Thus, in the air space or pressure head there is theoretically a constant pressure always driving the spray liquid out of the tank. In practice, the pressure will stay constant if the liquid is sprayed at a relatively slow rate. However, if the liquid is sprayed too fast, the pressure may drop as the Freon cannot boil off fast enough. The sharp objects at the bottom will facilitate the rising of the bubbles in the Freon. When the liquid is completely out of the tank the propellant will be fully vaporized and will have dropped from, for example, approximately 60 lbs. starting pressure to approximately 20 lbs. For purposes of illustration, if there is a three-gallon tank, when approximately two-thirds or two gallons of the liquid is gone all of the propellant will be vaporized. The last third of the liquid will be pushed out by the vaporized propellant as it drops from approximately a 60 lb. pressure to approximately 20 lbs. It can easily be seen that the amount of liquid in the tank makes no difference as it is only important to have an amount of propellant that is consistent with the volumetric capacity of the tank. It is important in systems such as shown herein to provide just the measured amount of propellant necessary to completely empty the tank.

The pressure cartridge or aerosol can 48, in addition to containing propellant, may contain a suitable insecticide or other chemical which it is desired to spray. The chemical may be in a concentrate in the aerosol can and will mix with the spray liquid or water. The chemical and the propellant should intermix in the pressure cartridge and the propellant should be chosen from the group of known propellants that will mix with the desired chemical spray. By combining a measured amount of propellant and a known quantity of chemical concentrate it is possible to properly proportion the chemical concentrate and water or other sprayable substance so that the spray will be of the desired strength to do the job intended.

The use, operation and function of the invention are as follows:

Shown and described herein is an improved pressurized garden spray or the like which is suitable for use around the home for spraying bushes, grass, flowers, etc. Conventional garden sprays of this general type utilize a hand pump or the like to supply pressure to spray the liquid from the tank. In the improved spray disclosed herein, a pressure cartridge, which may be an aerosol can, is supplied to furnish the pressure necessary for spraying the liquid from the tank. Whereas I have described the pressure cartridge as being an aerosol can it should be understood that other types of pressure means may be used, as what is important is to provide a propellant, for example Freon, to pressurize the tank. I prefer a pressure cartridge that contains a liquid rather than a cartridge containing gas under pressure.

It is a major feature of this invention to provide a means for admitting a measured amount of propellant into the spray tank such that a single shot of propellant will be completely used up in completely emptying the tank. In other words, it is one of the general purposes of this invention to utilize to the fullest the liquid propellant contained in the pressure cartridge. The metering can shown and described herein will provide exactly the proper amount of propellant to completely empty the tank's contents. The size of the metering can then, of course, will depend upon the volumetric capacity of the tank.

The particular metering valve described provides a proper measured metered shot of propellant for the spray tank. In the operation of the metering valve, the aerosol can or pressure cartridge is pressed down upon the projection or trigger 54 such that this projection will trigger or release the pressure fluid in the aerosol can. The fluid flows down through the hollow valve stem and into the metering can. The propellant will continue to flow into the can until the rising fluid slidably moves the floatable valve member 66 upward such that it closes the exhaust port 72. Once the exhaust port is closed, the liquid will have risen to a point near the top of the metering can and no further liquid can be introduced into the can. The proper amount of propellant for completely pressurizing the tank is then in the metering can. The aerosol can or pressure cartridge is then removed and the spring 82 moves the valve stem to the up position of FIGURE 2 and away from the motoring can outlet. The propellant then flows out of the outlet and moves the lips of the check valve 86 apart so that the fluid will flow into the spray tank. As described before, the liquid Freon will immediately fall to the bottom of the tank, being heavier than water, where it forms a layer below the spray liquid. The Freon will boil off forming a pressure head above the spray liquid which will force the spray liquid out of the standpipe and nozzle. The slideable floating valve member 66 normally rides on top the washer 62, hence when the valve stem is pushed downward the valve member 66 will move downward with it. Once the rising propellant reaches the floatable valve member it will push it upward until it closes the exhaust port 72, thus stopping the flow of propellant into the metering can.

In the particular spray tank shown herein the aerosol can is not carried with the tank and is only used to provide the metered shot of propellant. Once the tank is charged, the aerosol can is unscrewed and removed and the tank is ready for use.

Preferably the metering can and the associated valving equipment is positioned at the top of the spray tank and forms a part of the handle structure which opens for filling the tank. However, this is not necessary and the metering valve may be positioned at the side of the tank. Also the metering can does not have to be within the tank, although this is preferred.

An additional means of providing a measured shot of propellant is to provide a cartridge or a capsule containing propellant and having the outer covering formed of a water soluble material. The spray liquid will dissolve the water soluble covering thereby introducing a measured shot of propellant into the tank. Such cartridges may be generally similar to the small carbon dioxide cartridges used in seltzer bottles. Such a cartridge would provide a measured shot of propellant which would then operate similarly to a measured shot introduced by the metering valve.

Whereas the preferred form of the invention has been shown and described herein, it should be realized that there are many modifications, substitutions and alterations thereto within the scope of the following claims.

I claim:

1. A garden spray including a tank adapted to contain liquid to be sprayed, a nozzle connected to the tank and adapted to spray liquid therefrom, means adapted to cooperate with a pressure cartridge for pressurizing said tank, including a metering can attached to said tank, an inlet and outlet for passing propellant into and out of said metering can, a movable valve member positioned in said can and having a portion thereof extending into position for operable contact with said pressure cartridge, movement of said cartridge into contact with said valve extension being effective to release propellant from said cartridge.

2. The structure of claim 1 further characterized in that said valve extension is hollow and has an inlet in communication with said pressure cartridge, and a port in said valve extension forming the inlet for said metering can.

3. The structure of claim 2 further characterized by an O-ring normally closing said metering can inlet.

4. A garden spray including a tank adapted to contain liquid to be sprayed, a nozzle connected to the tank and adapted to spray liquid therefrom, means adapted to cooperate with a pressure cartridge for pressurizing said tank, including a metering can attached to said tank, an inlet and outlet for said can, a movable valve member positioned in said metering can and having a valve stem, said valve stem extending into position for operable contact with said pressure cartridge, said valve stem further having a portion thereof adapted to close said metering can outlet, movement of said pressure cartridge into contact with said valve stem being effective to release propellant from said cartridge and to move said valve stem into position to close said metering can outlet.

5. The structure of claim 4 further characterized by a spring in said metering can normally biasing said valve stem away from said metering can outlet.

6. The structure of claim 4 further characterized by an exhaust port for said metering can and a floatable valve element positioned on said valve stem and adapted to close said exhaust port when said metering can is full of propellant.

7. The structure of claim 6 further characterized in that said floatable valve element is slideable on said valve stem.

8. The structure of claim 4 further characterized by a check valve at said metering can outlet which allows propellant to flow out of the metering can and into the tank but does not permit liquid from the tank to flow into the metering can.

9. A garden spray including a tank adapted to contain a liquid to be sprayed, a nozzle connected to the tank and adapted to spray liquid therefrom, means adapted to cooperate with a pressure cartridge, for pressurizing the tank including a metering can attached to the tank, said metering can having an inlet, a valve attached to the metering can and arranged to control the flow of a pressure fluid from the cartridge through the inlet, said can having an outlet opening into the tank, the volumes of the metering can and tank being related such that the metering can will hold an amount of propellant sufficient to just completely empty the tank.

10. The structure of claim 9 further characterized by a floatable valve member movable in said metering can and operable to control the flow of propellant thereto.

11. The structure of claim 9 further caracterized in that said valve includes a hollow portion within said can forming a passage for directing the flow of propellant into said metering can, an opening in said valve portion in communication with the interior of said metering can and with said passage, and a valve element normally closing said opening.

12. The structure of claim 11 further characterized in that said valve portion is effective to block said metering can outlet, and a spring biasing said valve portion away from said metering can outlet.

13. The structure of claim 9 further characterized by a filling opening for said tank, a closure for said filling opening, said metering can being attached to said closure.

14. The structure of claim 13 further characterized in that said metering can is within the tank.

References Cited in the file of this patent

UNITED STATES PATENTS

| | | |
|---|---|---|
| 1,987,766 | Wertz | Jan. 15, 1935 |
| 2,443,981 | Funk et al. | June 22, 1948 |
| 2,857,937 | Ayres | Oct. 28, 1958 |
| 2,946,389 | Barnes | July 26, 1960 |